Oct. 21, 1941.   G. P. EVANS   2,259,929
CATTLE HOLDER
Filed Feb. 13, 1941
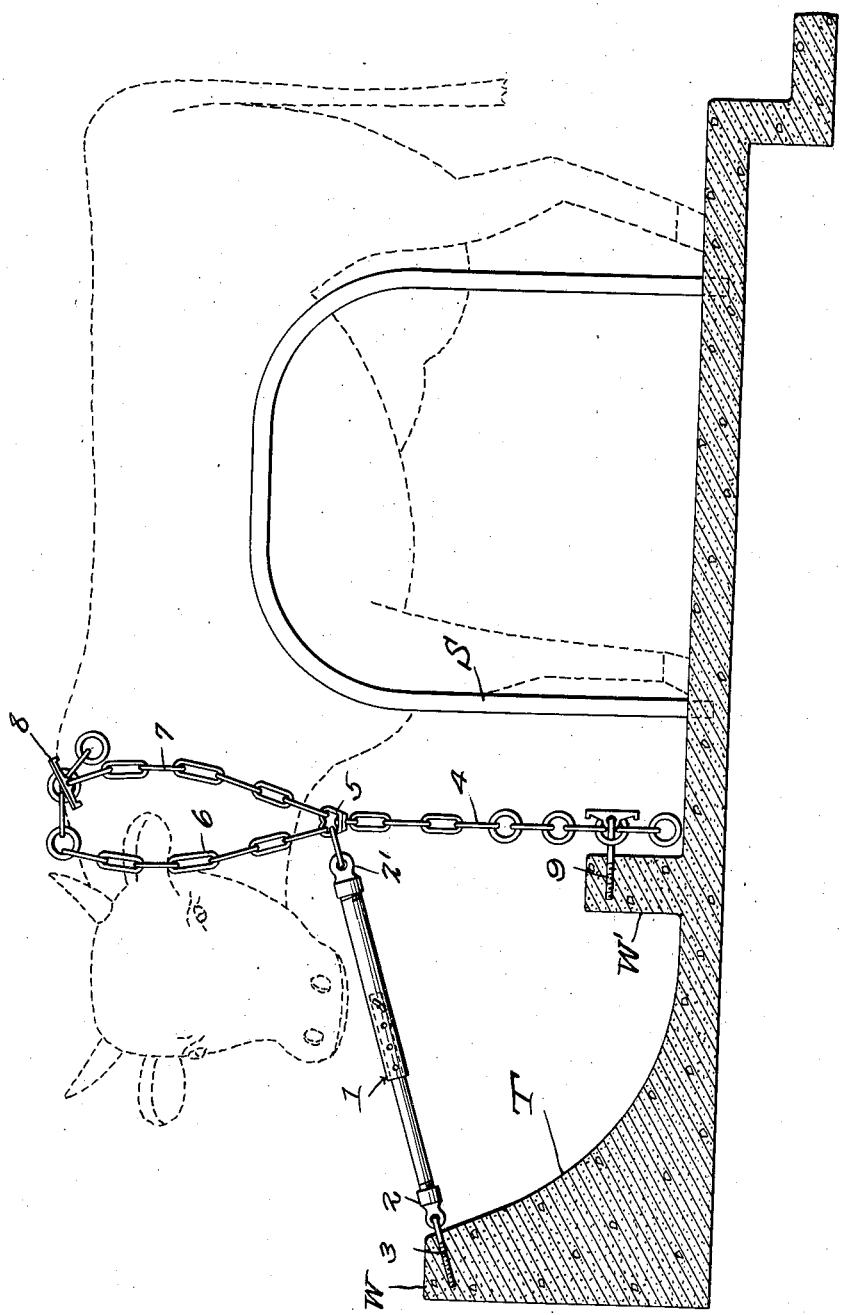
G. P. Evans INVENTOR.
BY Knowles
ATTORNEYS.

Patented Oct. 21, 1941

2,259,929

UNITED STATES PATENT OFFICE 2,259,929

CATTLE HOLDER

George P. Evans, Hellam, Pa.

Application February 13, 1941, Serial No. 378,828

3 Claims. (Cl. 119—119)

This invention relates to a device to be used in lieu of the heavy, cumbersome and costly stanchions usually employed for keeping cattle in their stalls.

An object is to provide a device which is simple in construction, easily installed, can be manufactured at low cost, and can be readily applied to the stock to be secured.

Another object is to provide a holding device which affords the cattle more freedom of movement than heretofore.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing, which is a perspective view of the device, the preferred form of the invention has been shown, a portion of the trough to which the holder is connected, being illustrated in section.

Referring to the drawing by characters of reference, 1 designates a rigid sectional rod adjustable as to length and having eyes 2 and 2' at the respective ends. The rod can be formed of telescopic members suitably connected in an obvious manner as shown. Eye 2 pivotally engages an eye-bolt 3 anchored in the outer wall W of a trough T extending across the cattle stalls at one end as is usual. Adjustably fastened to the other wall W' of the trough is the lower end of a restraining chain 4 the other end of which is joined to eye 2'. A swivel link 5 is also connected to this chain 4 near eye 2' and has separate neck chains 6 and 7 extending therefrom. A fastener, in the form of the usual toggle 8, is provided for detachably connecting the neck chains at their free ends.

Any suitable means may be used for attaching chain 4 to wall W'. For example, a bolt 9 may be anchored therein and provided with a chain-engaging snap hook, or toggle, or other type of fastener.

In practice the chain 4 is fastened to the front of the center of a stall and the eye bolt 3 is located directly in front thereof but at the opposite side of trough T. One side of the stall has been indicated at S. Rod 1 is adjusted to such a length as to extend across the trough while inclined to the horizontal when chain 4 is taut. Both rod 1 and chain 4 are adjustable as to length in order to accommodate different breeds and sizes of animals. With the parts thus located and adjusted, the neck chains 6 and 7 are fastened about the animal to be held. As both the rod and chain 4 can swing freely the animal is allowed the maximum comfort consistent with the necessary restraint to hold it in the stall. Rod 1 fastened directly below the neck chains resists any attempt of the animal to move backward or directly forward. Chain 4 in connection with rod 1 and the neck chains resists any attempt of the animal to move forward in a circular direction by pivoting on eye 2.

An important object in the present invention is to give the animal as much freedom of movement as possible not only upwardly and downwardly but also laterally. The structure allows the head of the animal not only free up and down movement limited only by the length of the chain 4 but also permits lateral swinging movement which increases in extent as the neck is lowered. This is due to the fact that the rod 1 is free to swing laterally as well as vertically and as the tension of the chain 4 is relaxed and the distance between eye 2' and the wall W becomes less, the extent of lateral swinging movement of the rod becomes greater. Thus when the animal is reclining, it does not suffer the restraint present should the part 1 be capable of swinging in a vertical plane only.

When the animal rises to his feet and the chain 4 thus placed under tension, such action tends to swing the rod 1 toward the point where the maximum elevation of the neck of the animal can be effected, which is at the center of the stall. Thus the device acts to urge the rising animal to assume a position at the center of the stall.

What is claimed is:

1. A cattle holder including a rigid rod, means for pivotally anchoring the rod at one end for up and down and lateral swinging movement, a flexible restraining device connected to the other end thereof, means for anchoring said device, and means for embracing the neck of an animal to support the rod and flexible element at their connected ends and close to the neck of the animal.

2. The combination with a trough, of a rod pivotally anchored at one side of the trough for up and down and lateral swinging movement, a flexible restraining element anchored at one end at the other side of the trough and connected at its other end to the rod, said element being proportioned to become taut when the rod is moved upwardly to an inclined position, and neck embracing means connected to said element close to the rod.

3. The combination with a trough and stall, of a longitudinally adjustable rod pivotally anchored at one side of the trough for up and down and lateral swinging movement, a flexible restraining element adjustably anchored at one end at the other side of the trough and connected at its other end to the rod, said element being proportioned to become taut when the rod is moved upwardly to an inclined position and constituting means for releasing the rod for lateral swinging movement increasing in proportion to the decrease in elevation of that end of the rod to which the restraining element is attached, and neck embracing means connected to said element close to the rod.

GEORGE P. EVANS.